US006715147B1

(12) United States Patent
Barker

(10) Patent No.: US 6,715,147 B1
(45) Date of Patent: *Mar. 30, 2004

(54) METHOD AND SYSTEM FOR INTERFACING A PLURALITY OF APPLICATIONS CONFORMING TO A STANDARD

(75) Inventor: Kevin Spencer Barker, Raleigh, NC (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1089 days.

(21) Appl. No.: 08/828,687

(22) Filed: Mar. 31, 1997

(51) Int. Cl.[7] .................................................. G06F 9/44
(52) U.S. Cl. ......................................... 719/315; 719/328
(58) Field of Search ................................. 395/682, 683, 395/200.68, 200.73, 200.75, 701, 8, 705; 709/302, 303, 238, 243, 245, 315, 328; 717/100, 116

(56) References Cited

U.S. PATENT DOCUMENTS

| | | | | |
|---|---|---|---|---|
| 5,371,852 A | * | 12/1994 | Attanasio et al. | 395/200 |
| 5,446,902 A | * | 8/1995 | Islam | 395/700 |
| 5,493,680 A | * | 2/1996 | Danforth | 395/700 |
| 5,509,123 A | * | 4/1996 | Dobbins et al. | 395/200.15 |
| 5,787,425 A | * | 7/1998 | Bigus | 707/6 |
| 5,901,314 A | * | 5/1999 | Boehme et al. | 395/701 |

OTHER PUBLICATIONS

B. Stroustrup, The C++ Programming Language, seccond edition, pp. 560–563, Jul. 1991.*

H. Carr, et al, "Compiling Distributed C++", IEEE, pp. 496–503, Dec. 1993.*

M. Syor, et al, "Applying Network Management Standards to System Management; the case for the Common Agent", IEEE, pp. 110–117, Apr. 1993.*

* cited by examiner

Primary Examiner—Sue Lao
(74) Attorney, Agent, or Firm—Myers, Bigel, Sibley and Sajovec, P.A.; A. Bruce Clay

(57) ABSTRACT

Multiple applications that conform to a standard are accessed by a single computer. An abstract class is created with defined Data Objects and desired functions. For each of the services that will conform to the standard interface, subclasses of the abstract class are then created.

12 Claims, 4 Drawing Sheets

Process to develop an API that can access several services at the same time

METHOD AND SYSTEM FOR INTERFACING A PLURALITY OF APPLICATIONS CONFORMING TO A STANDARD

FIELD OF THE INVENTION

This invention relates in general to computer software, and in particular to a method and system for creating a standard interface which allows two or more systems to be accessed at the same time on the same machine.

BACKGROUND OF THE INVENTION

Services such as electronic mail, document management, image processing, and fax processing are common software applications available from many different vendors. These applications generally provide a standard graphical interface for general use as well as a programmable interface in order to allow custom applications to make use of the services. Frequently, standards organizations have been formed to create interfaces subject to standard formats to allow customers to write one set of programs that can be used with any of the services that comply therewith. Companies often find, for many valid reasons, that they receive the same service from several different vendors, and at some point they need to interface with more than one of the services at the same time. A classic example of this is a mail gateway that connects two or more distinct mail systems together. Another example is having images stored in Lotus Notes and Visual Info and a need to view images from both systems at the same time as well as exchange data between them. In cases such as these, a standard programmable interface fails because it requires that only one service be available on a machine at any one time (usually because the interface is a Dynamic Link Library (DLL) and the operating systems can only load one of these with the same name at any one time). Thus there needs to be a way to create a standard interface which allows two or more systems to be accessed at the same time on the same machine and in which the program does not need to be changed when later on additional programs are developed that conformed to the same standard or an enhanced version of the standard.

The reasons for this access are for gateway type functions which need to access data spread over services provided by different vendors at the same time. What is needed is an interface with the following features and characteristics:

(1) Ability to write programs that work with any product conforming to the interface with out any vendor specific code needing to be added to the program;

(2) Programs written to the interface can work with more than one product that conforms to the interface at the same time. This should also be simple and straight forward;

(3) Programs that use the interface must continue to function even if new features are added to the interface and must not require recompilation or linking of the old program.

These requirements disqualify the typical model where standard function entry points are defined and each vendor provides a DLL with the same name and entry points. Having each vendor create a DLL with a different name could work, but would require programs to be built for each specific vendor's product, or the programs would have to dynamically load each DLL and load all of the function points in each of the DLLs and keep track of which set of function points to use. This can be very tedious and error prone.

SUMMARY OF THE INVENTION

The present invention relates to a method and system for interfacing, from a single computer, a plurality of applications and services that conform to a standard. An abstract class is created with defined Data Objects and desired functions. For each of the services that will conform to the standard interface, subclasses of the abstract class are then created.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
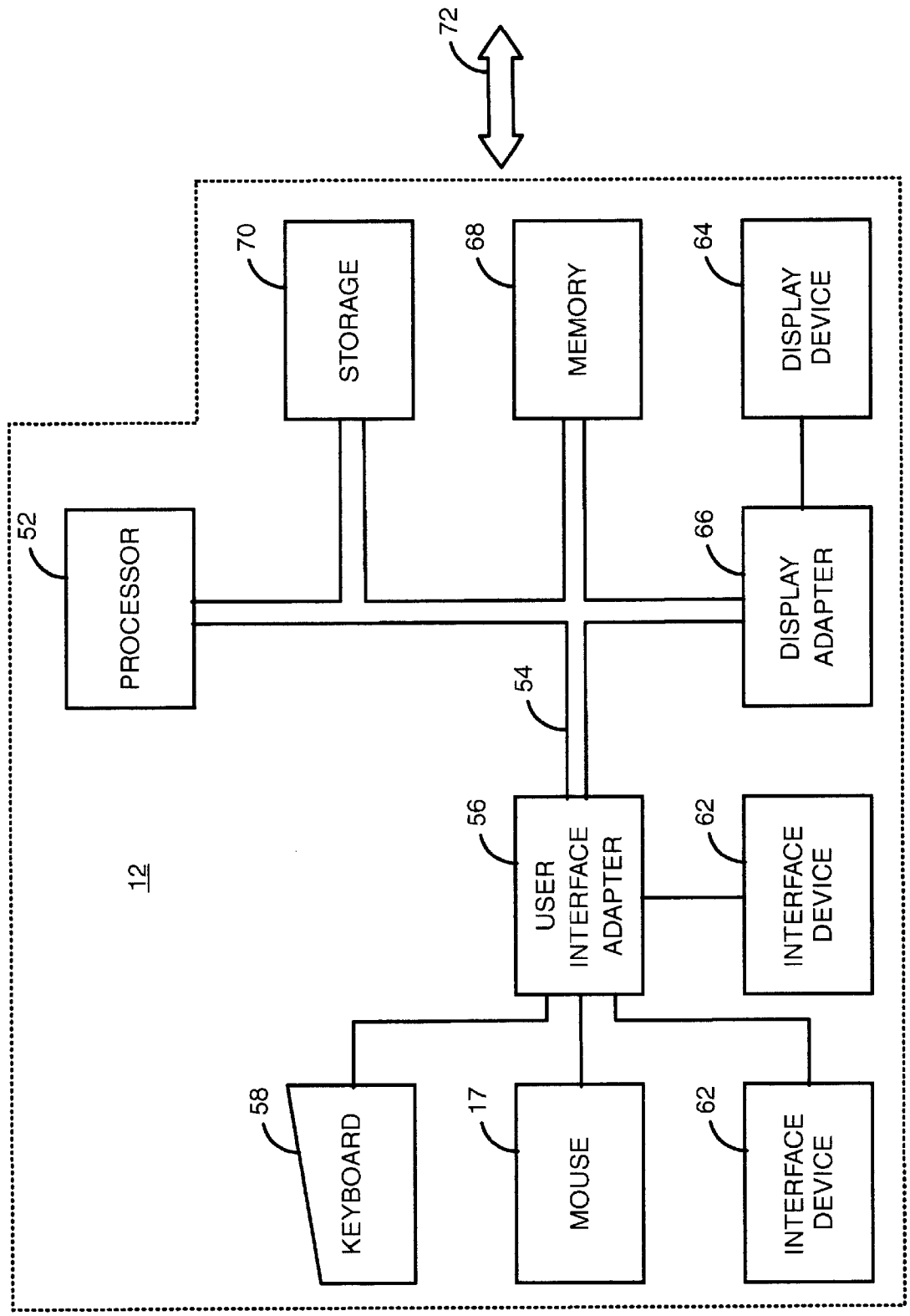
FIG. 1 illustrates a representative workstation hardware environment in which the present invention may be practiced.

FIG. 1 illustrates a representative workstation hardware environment in which the present invention may be practiced. The environment of FIG. 1 comprises a representative single user computer/workstation 12, such as a personal computer, including related peripheral devices. The workstation 12 includes a microprocessor 52 and a bus 54 employed to connect and enable communication between the components of the workstation 12 in accordance with known techniques. The workstation 12 typically includes a user interface adapter 56, which connects the microprocessor 52 via the bus 54 to one or more interface devices, such as a keyboard 58, a mouse 17, and/or other interface devices 62, which can be any user interface device, such as a touch sensitive screen, digitized entry pad, etc. the bus 54 also connects a display device 64, such as an LCD screen or monitor to the microprocessor 52 via a display adaptor 66. The bus 54 also connects the microprocessor 52 to memory 68 and permanent storage 70 which can include a hard drive, tape drive, etc.

The workstation 12 communicates via a communications link 22 with other computers or networks of computers. The workstation 12 may be associated with such other computers in a local area network (LAN) or a wide area network (WAN), or the workstation 12 can be a client in a client/server arrangement with another computer, etc. all of these configurations, as well as the appropriate communications hardware and software, are known in the art.

Figure 2:
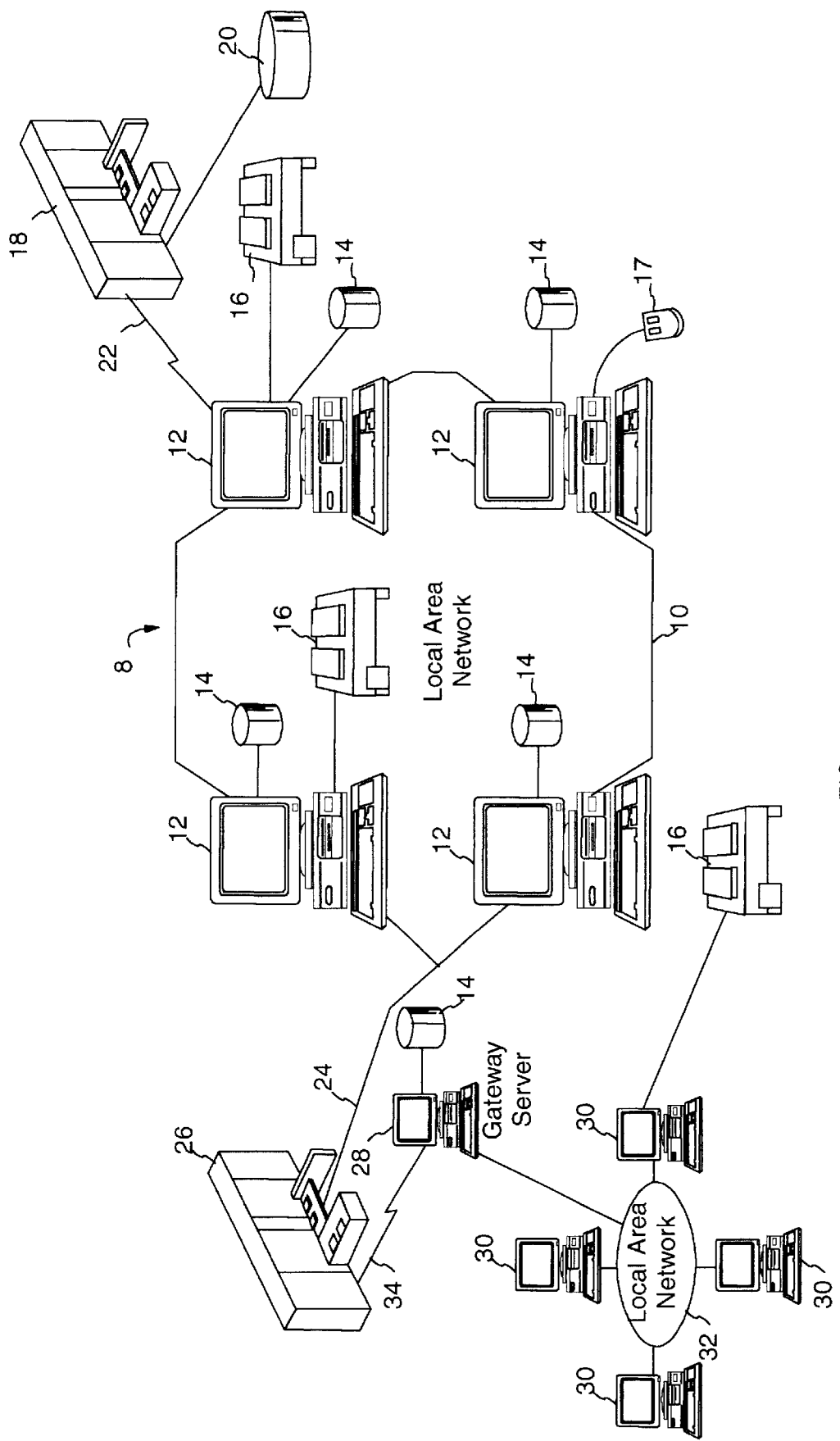
FIG. 2 is a pictorial representation of a data processing system which may be utilized to implement a method and system of the present invention.

Referring to FIG. 2, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers/workstations 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of the communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

In the preferred embodiment, the present invention is implemented in the Java language. Object oriented languages, such as Java, Smalltalk and C++, typically include class libraries for use by developers when programming (developing applications) in the language. Class libraries are reusable sets of classes which typically provide relatively high level functionality. A class is one of the basic building blocks of object oriented languages, and comprises code which represents a combination of function and data. A developer creates an application by adding classes from a class library to the software application being created. A copy or instance of a class is included in the application being created.

A developer may manipulate classes in a predetermined number of ways, depending on the features of the individual language. For example, most object oriented classes have a number of basic characteristics, including encapsulation, polymorphism, and inheritance. Through polymorphism, a software component or class may make a request of another instance of the class without knowing exactly what that component or object is. The object or component which receives the request interprets the request and determines, in accordance with its internal data and functions, how to execute the request. A developer can write a subclass which inherits behavior from all of its parent classes. All of these properties of object oriented programming, as well as related object oriented programming techniques, are well known to those skilled in the art, and will not be discussed in depth herein.

The present invention as described herein is applicable to products from any various sets of different companies. However, for the sake of simplicity, the invention will be described with respect to three products available from International Business Machines corporation (IBM). IBM has three different products that provide the same basic imaging services functions but designed for different levels of need, they are: VisualInfo, ImagePlus 400 and ImagePlus MVS. One of these products is tailored to high volume imaging needs while the other two provide more flexibility but not the same performance. From the different performance and flexibility trade offs, customers may need all three systems and may also need to access all three systems at the same time (ie, when a customer calls in to, for example, an insurance company, the insurance company would want access to all records that involve the customer, from car insurance claims to home owner policies). By creating a Java interface in a special way, programs can be written to access, for example, any of the three IBM products separately or all at the same time.

Java has three types of classes: regular, abstract and interface. Regular classes define function and provide the code to perform the function. An abstract class defines functions and member data and may or may not provide code to perform some of the functions as well. New classes that are based on an abstract class or regular class are said to be subclasses. Subclasses that are based on an abstract class can use any code provided in the abstract class, but may also replace the code that provides some of the functions. An interface class is just like an abstract class except that no code can be provided to perform any of the functions that are defined by the class. Anywhere an abstract class is used an interface class could also be used, but in the case of the class based on the interface class, all code would have to be provided by the new class. Because the term "interface" is being used to mean other things already, abstract classes will be referred to herein to cover both abstract classes as well as interface classes.

Figure 3:
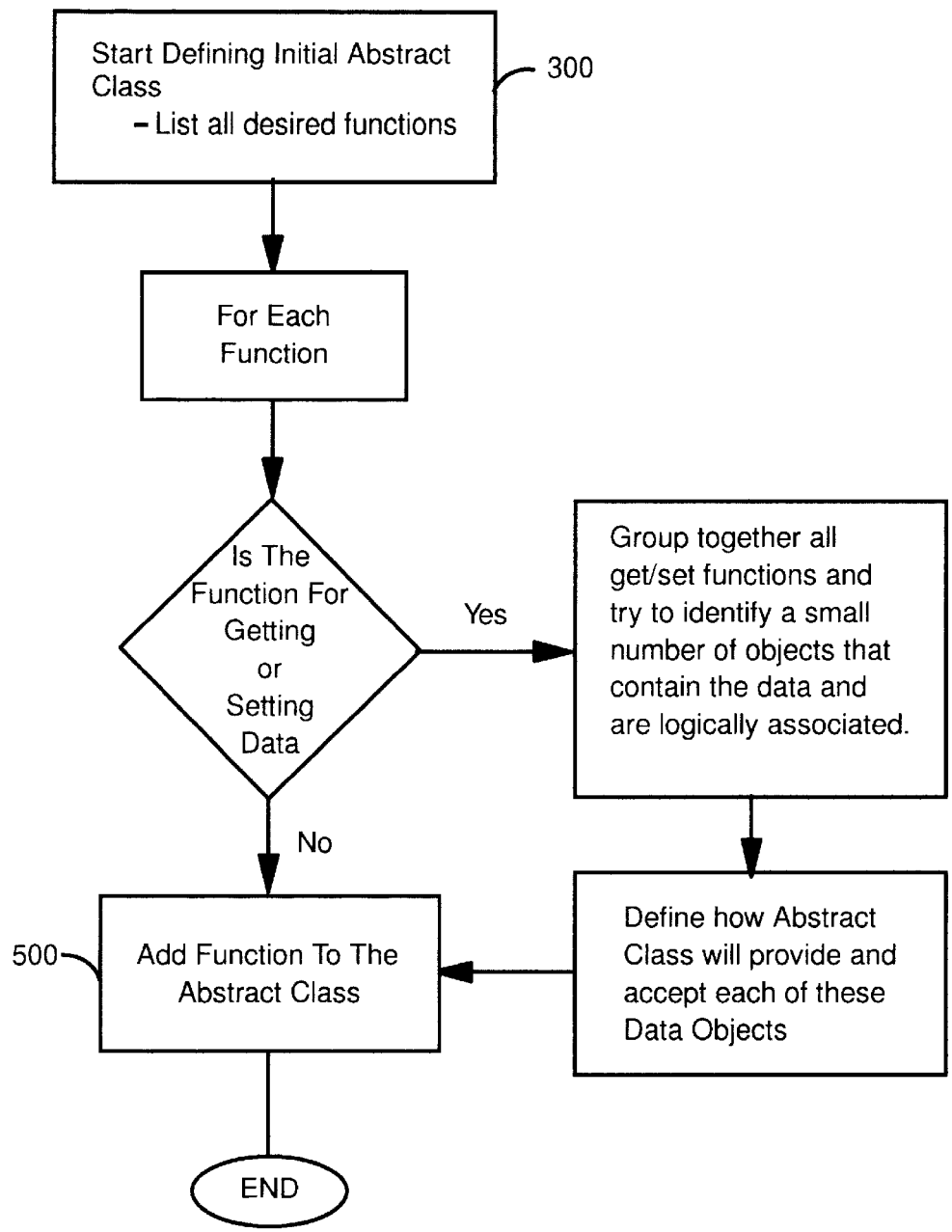
FIG. 3 is a flowchart illustrating generic development of an interface that will allow simultaneous access to multiple vendor services/applications in accordance with the present invention.

Referring to FIG. 3, a flowchart illustrates the present invention in use to generically develop an interface that will allow access to multiple vendor services/applications simultaneously. An abstract class is first created with the desired common functions at block 300. There should be a primary class that maintains the connection to the particular service through which requests are passed. There can also be several other classes defined that represent the data passed in and returned from the session class that can be used with sessions from any of the services. Subclasses of the abstract class are then created for each of the plurality of products.

Then, after block 302 for each function, it is determined at decision block 304 whether the function is for getting or setting data. If the response to decision block 304 is yes, all get/set functions are grouped together at block 306, and a small number of objects are attempted to be identified that contain the data and are logically associated. At block 308, it is defined how the abstract class (defined at block 300) will provide and accept each of these data objects. Subsequent to block 308 or if the response to decision block 304 is no, function is added to the abstract class at block 310. The present invention then ends at 312.

There are several different ways to provide function in the new subclasses:

(1) In the subclass, define some of the functions to call C functions (these are called Java Native Functions). When doing this, also identify which DLL to load and get the C functions from. Because of this freedom to name the DLL, all the subclasses could have identical code but simply load a different DLL. Because the DLL names are different, the Java program can access all of the different systems at the same time. Java keeps track of the different DLLs that are needed for the Java programmer.

(2) The functions in each subclass can be implemented using C function calls or using Java interfaces to network or other systems. The code and implementation of each subclass can be completely different from any other subclass (the public functions just need to be the same, but even these can change from native Java code to C functions).

When a Java program is written, reference is made only to a parent abstract class so the code can work with any of the subclasses. The only time the program needs to refer to the subclasses is when they are created. Java provides a way to instantiate classes (create an object that is defined by a particular class) by using the character string name of the class at runtime. In C and C++ this could not be done as everything had to be known and defined at compile time, not when the program was running. A Java program can make use of services from additional vendors in the future by receiving the name of a new subclass that has been installed.

In a more specific example using three IBM ImagePlus products, the following classes are defined:

(1) IMGSession—functions include: logon to server (establish connection); search for documents (returns a list of documents matching the search criteria); get a document (returns an IMGDoc object that has all the data available about the requested document. The document identifier needed for this call came from the search results); and logoff (terminate connection to the service).

(2) IMGDoc—this object provides access to all the data related to a particular document, the data is accessed by the following functions: GetNumber of Pages (function to provide the number of pages in this document); GetPage(n) (returns an IMGPage for the requested page, the IMGPage includes the image and any annotations that may relate to this particular page); GetNumberOfAttributes (attributes are searchable pieces of information about this document, the IMGAttribute object includes the name of the value as well as the value itself); and GetAttribute(n) (returns the requested attribute).

There are more classes and functions to the classes that may be created. The search function in IMGSession takes the same parameters for all of the three IBM products (actually the underlying classes have to convert the parameters differently to work with each of the services). The IMGDoc objects look the same whether they come from VisualInfo or ImagePlus MVS. The Java program only has to keep track of the IMGSession objects and not necessarily worry about which service they actually connect to. To search all three products, an IMGSession object is created for each product and the same arguments are passed to each one. The resulting document lists can all be displayed on the screen in a list together. By this token, an IMGDoc document from VisualInfo and ImagePlus MVS can be displayed using the same code.

Figure 4:
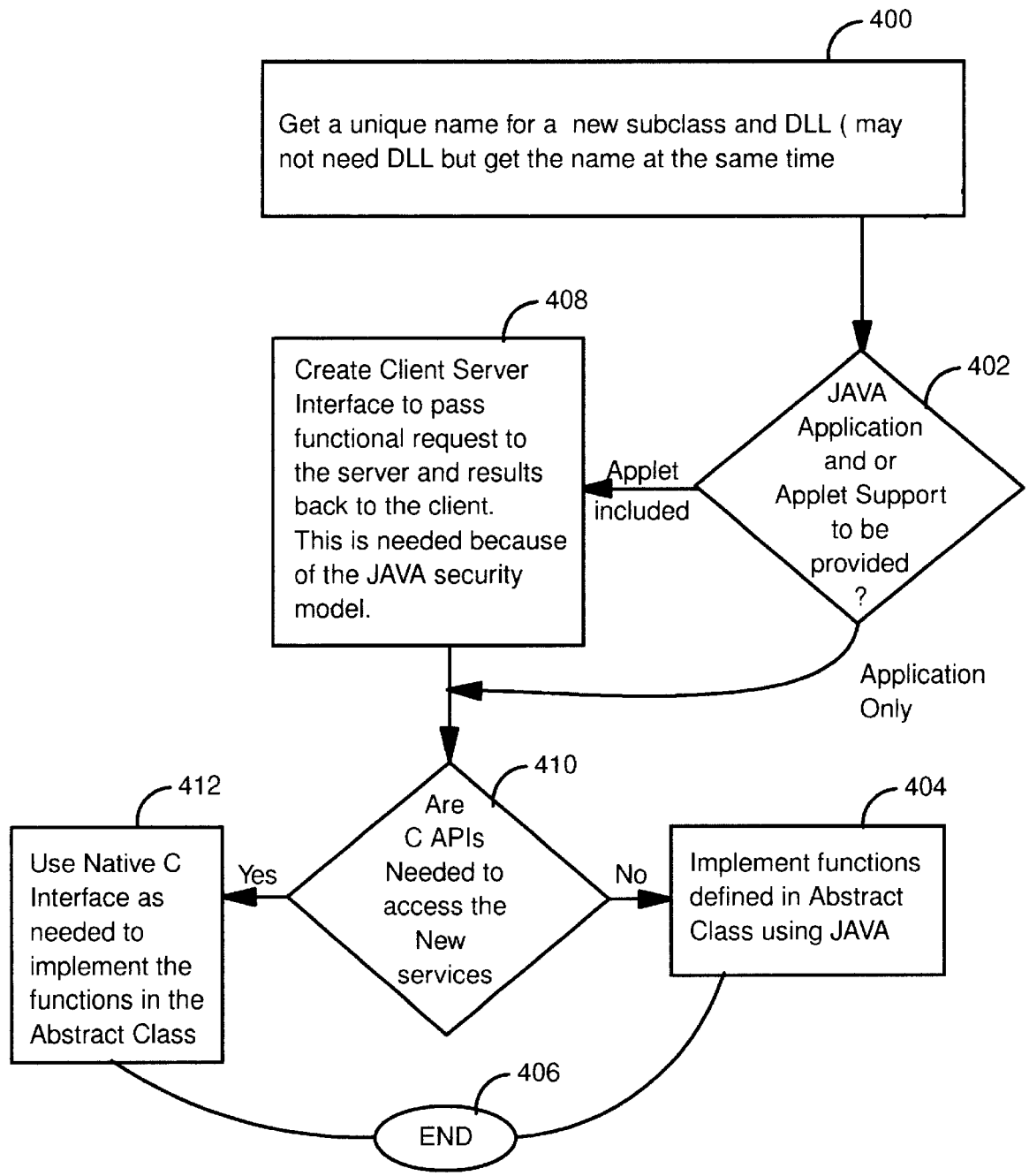
FIG. 4 is a flowchart illustrating a vendor's required actions so that any platform/application using a Java abstract class as constructed herein can access his service/application.

Referring to FIG. 4, a flowchart illustrates the actions a vendor performs to build his part of an application in order to allow any platform/application using the Java abstract class (created in block 310 above, FIG. 3) access his service/application. First, a unique name is created for a new subclass and DLL (may not need a DLL but get the name at the same time) at block 400. It is then determined at decision block 402 whether Java application and applet support are to be provided. If Java application support only is to be provided, it is then determined at decision block 410, whether or not C API's are needed to access the new services. If the response to decision block 410 is yes, native C interface is used at block 412, as needed, to implement the functions in the abstract class. If the response to decision block 410 is no, the, present invention proceeds to block 404, in which the functions defined in the abstract class are defined using Java. Subsequent to block 404 or block 412, the present invention ends at 406. The present invention then ends at 406.

If it is determined at decision block 402 that applet support is to be included, a client/server interface is created at block 408 to pass a function request to the server and results back to the client (required due to Java applet security restrictions). The present invention then proceeds to decision block 410, as previously described above.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of interfacing, from a single computer, a plurality of application programs that conform to a standard, comprising the steps of:

creating an abstract class with desired functions common to the plurality of application programs wherein the abstract class selectively provides code for the desired functions;

defining additional classes to contain data that is passed to and from said desired functions; and creating subclasses for each of the plurality of application programs to implement said desired functions of said abstract class wherein the subclasses selectively utilize code provided by the abstract class or replace the code provided by the abstract class.

2. The method of claim 1, wherein said step of creating an abstract class further comprises:

creating a primary class in order to maintain connection to a specific application or service through which requests are passed thereto.

3. The method of claim 1, wherein said step of creating an abstract class further comprises:

grouping together a number of identified objects that contain logically associated data.

4. The method of claim 3, further comprising:

defining how said abstract class will provide and accept said objects.

5. A system for interfacing, from a single computer, a plurality of application programs that conform to a standard, comprising:

means for creating an abstract class with desired functions common to the plurality of application programs wherein the abstract class selectively provides code for the desired functions;

means for defining additional classes to contain data that is passed to and from said desired functions; and means for creating subclasses for each of the plurality of application programs to implement said desired functions of said abstract class wherein the subclasses selectively utilize code provided by the abstract class or replace the code provided by the abstract class.

6. The system of claim 5, wherein said means for creating an abstract class further comprises:

means for creating a primary class in order to maintain connection to a specific application or service through which requests are passed thereto.

7. The system of claim 5, wherein said means for creating an abstract class further comprises:

means for grouping together a number of identified objects that contain logically associated data.

8. The system of claim 7, further comprising:

means for defining how said abstract class will provide and accept said objects.

9. A computer program product recorded on computer readable medium for interfacing, from a single computer, a plurality of application programs that conform to a standard, comprising:

computer readable means for creating an abstract class with desired functions common to the plurality of application programs wherein the abstract class selectively provides code for the desired functions;

computer readable means for defining additional classes to contain data that is passed to and from said desired functions; and computer readable means for creating subclasses for each of the plurality of application programs to implement said desired functions of said abstract class wherein the subclasses selectively utilize code provided by the abstract class or replace the code provided by the abstract class.

10. The program product of claim 9, wherein said computer readable means for creating an abstract class further comprises:

computer readable means for creating a primary class in order to maintain connection to a specific application or service through which requests are passed thereto.

11. The program product of claim 9, wherein said computer readable means for creating an abstract class further comprises:

computer readable means for grouping together a number of identified objects that contain logically associated data.

12. The program product of claim 11, further comprising:

computer readable means for defining how said abstract class will provide and accept said objects.

* * * * *